United States Patent [19]
Muller et al.

[11] Patent Number: 4,886,151
[45] Date of Patent: Dec. 12, 1989

[54] GEARSHIFTING DEVICE FOR A MANUALLY OPERATED TRANSMISSION FOR MOTOR VEHICLES

[76] Inventors: Erich R. Muller, Hohe Strasse 15, D-7110 Ohringen-Cappel; Edmund Volkert, Steppachweg 77, D-7107 Neckarsulm, both of Fed. Rep. of Germany

[21] Appl. No.: 171,181

[22] Filed: Mar. 18, 1988

Related U.S. Application Data

[63] Continuation-in-part of Ser. No. 907,725, Sep. 15, 1986, abandoned, which is a continuation-in-part of Ser. No. 740,074, May 13, 1985, abandoned.

[30] Foreign Application Priority Data

Sep. 14, 1983 [DE] Fed. Rep. of Germany ....... 3333216

[51] Int. Cl.$^4$ .......................... B60K 41/22; F16H 5/42
[52] U.S. Cl. .................... 192/3.62; 192/3.63; 74/336 R; 74/365
[58] Field of Search .............. 192/3.51, 3.54, 3.55, 192/3.58, 3.61, 3.62, 3.63; 74/336 R, 364, 365, 476, 477, 483 R

[56] References Cited

U.S. PATENT DOCUMENTS

| | | | |
|---|---|---|---|
| 1,054,337 | 2/1913 | Center | 74/483 R |
| 1,274,632 | 8/1918 | Thormoen | 74/483 R |
| 1,309,853 | 7/1919 | Jensen | 74/483 R |
| 1,619,955 | 3/1927 | Reinhard | 74/483 R |
| 1,652,943 | 12/1927 | Kaser | 74/483 R |
| 2,121,157 | 6/1938 | Lempereur et al. | 192/3.63 X |
| 2,177,209 | 10/1939 | Elliott | 192/3.63 |
| 2,221,199 | 11/1940 | Peo et al. | 192/3.63 |
| 2,244,092 | 6/1941 | Wheeler | 192/3.63 |
| 3,478,851 | 11/1969 | Smyth et al. | 192/3.55 |
| 4,146,120 | 3/1979 | Stevens | 192/3.63 |

FOREIGN PATENT DOCUMENTS

| | | |
|---|---|---|
| 1081317 | 5/1960 | Fed. Rep. of Germany . |
| 2952204 | 6/1981 | Fed. Rep. of Germany . |
| 3011131 | 10/1981 | Fed. Rep. of Germany . |
| 888421 | 12/1943 | France ............ 74/476 |
| 2348077 | 11/1977 | France . |

Primary Examiner—Leslie A. Braun
Assistant Examiner—Richard M. Lorence
Attorney, Agent, or Firm—Kane, Dalsimer, Sullivan, Kurucz, Levy, Eisele and Richard

[57] ABSTRACT

In a gear shifting device for the manual transmission of a motor vehicle with a gearshfit lever, with which the individual gear steps can be engaged over a gearshift rod, the gear shifting motion of the gearshift lever is transferred to the gearshift rod in a nonmechanical manner. The movement of the gearshift lever from the neutral position into the gear shifting position takes place in two steps, the first step acting as a preselection step and the function of the second step being to engage the selected gear step. A locking device permits movement of the gearshift lever from the first into the second step only when the necessary conditions exist for engaging the selected gear step perfectly; that is, when the clutch is disengaged and the gear wheels of the gear steps to be engaged are synchronized.

5 Claims, 2 Drawing Sheets

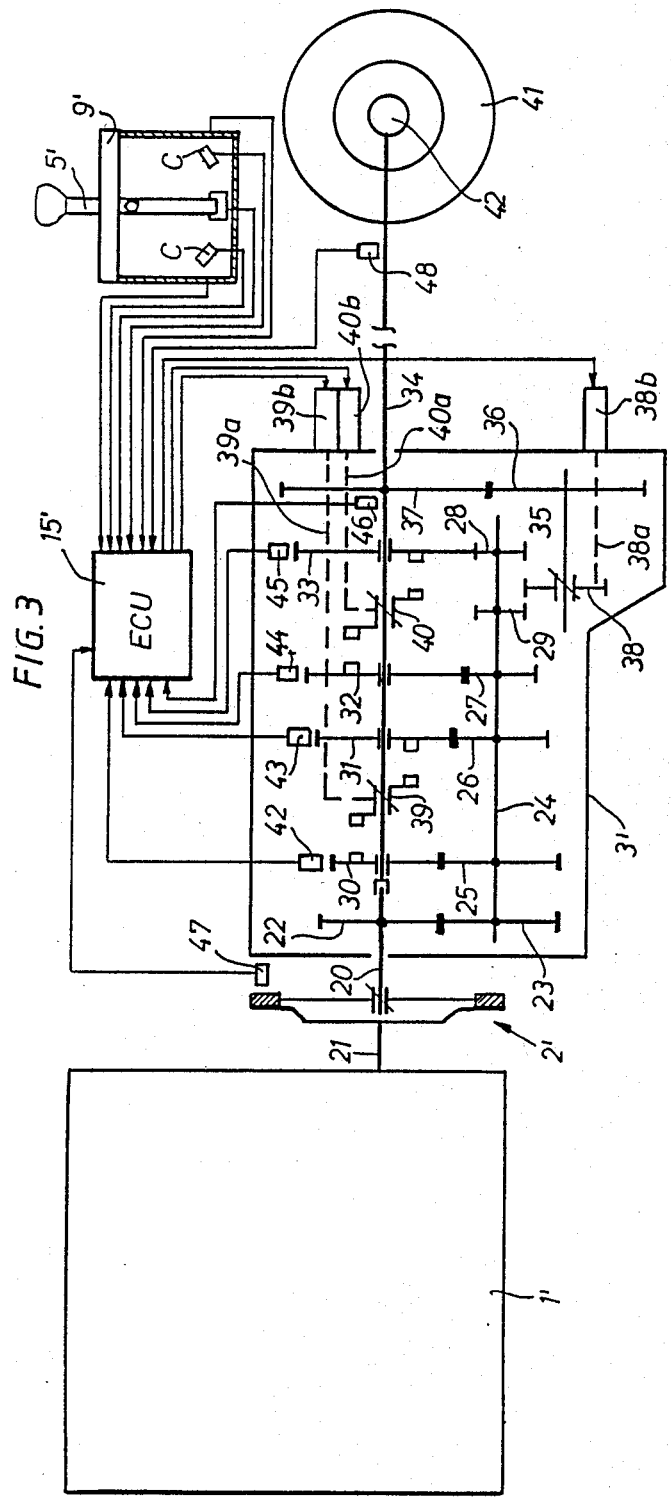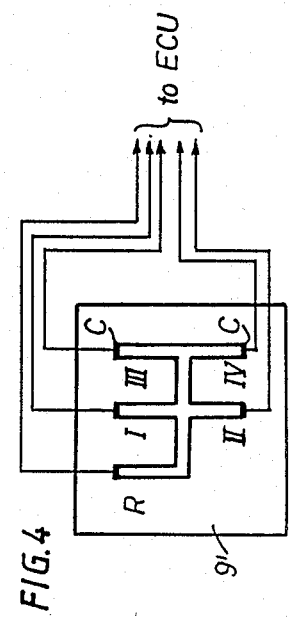

GEARSHIFTING DEVICE FOR A MANUALLY OPERATED TRANSMISSION FOR MOTOR VEHICLES

The following is a continuation-in-part of U.S. Ser. No. 907,725 filed Sept. 15, 1986, now abandoned which, in turn, is a continuation-in-part of application No. 740,074, filed May 13, 1985, now abandoned.

BACKGROUND OF THE INVENTION

The invention relates to a gear shifting device. The object of the invention is to simplify the engagement of the gear steps without detracting from the gear shifting feel, the gear shifting times and the gear shifting reliability relative to conventional, mechanical gear shifting devices.

SUMMARY OF THE INVENTION

The inventive gear shifting device does without the conventional mechanical transfer of the gear shifting motion from the gearshift lever to the gear shifting rod. As a consequence, the transfer of movements of the transmission to the gearshift lever is avoided and the transfer of body noise from the transmission to the body of the vehicle is reduced. Moreover, the possibility is given, especially if the gear steps are engaged electrically, electro-hydraulically or electropneumatically, of taking into consideration not only the activation of the clutch as a precondition for engaging a gear step, but also other parameters, such as the synchronization of the gearwheels of the gear that is to be engaged, the motion of the vehicle when engaging the reverse gear and optionally other engine components.

The invention is also usable for transmissions, in which, instead of the gear rod, a device is provided which is activated electrically, pneumatically or hydraulically to engage each step.

BRIEF DESCRIPTION OF THE DRAWINGS

FIG. 3 is a schematic representation of a 4-speed transmission and its controls.

FIG. 4 is a view of the gearshift gate of the gearshift lever.

DETAILED DESCRIPTION OF THE PREFERRED EMBODIMENT

Figure 1:
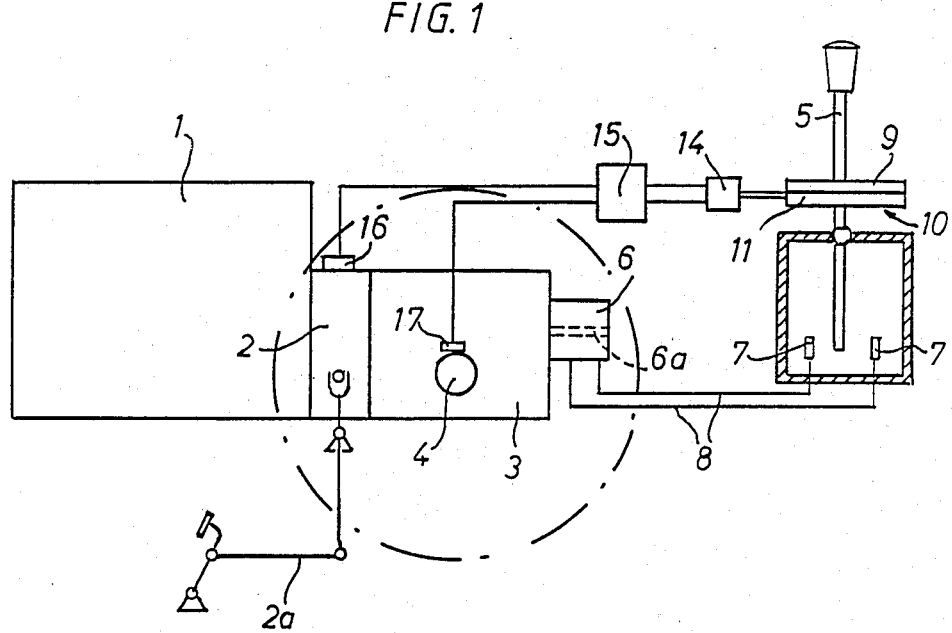
FIG. 1 shows a schematic representation of a motor vehicle driving mechanism.

The vehicle engine, labeled 1 in FIG. 1, drives the driveshaft 4 of the vehicle over a disengageable clutch 2 and a mechanical gearbox 3. Clutch 2 is actuated by clutch actuating mechanism 2a. The gear steps of the mechanical gearbox 3 are engaged by a gearshift lever 5, which activates over an electric, hydrcaulic or pneumatic switching device 6 the pivoted movable gearshift rod 6a in the mechanical gearshift 3. The switching device 6 is provided with the appropriate facilities, such as rotary magnet (not shown) in order to shift and rotate the gearshift rod in correspondence with the gear step selected. The switching device 6 receives the appropriate signals by electrical means through contacts 7, which are activated by gearshift lever 5 and are connected through wiring 8 with the switching device 6. In FIG. 1, only the contact assigned to the first and second gear are shown. Obviously, appropriate contacts are assigned to the remaining gear steps and the gearshift lever 5 can act on these through its motion, which is specified by the gear shifting gate. Gear shifting gate 9 includes transverse slot 9a defining gear shift lanes for forward gears I-II and III-IV, a transverse slot 9c for reverse and longitudinal slot 9b interconnecting slot 9a and 9c.

Figure 2:
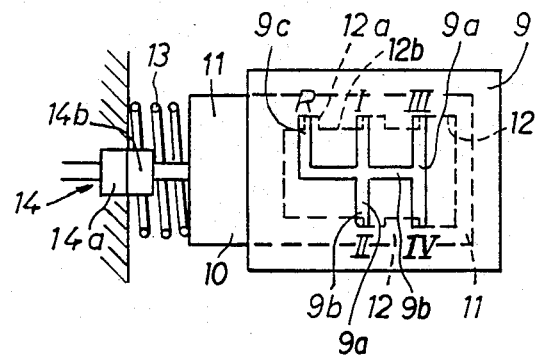
FIG. 2 shows a gear shifting gate for a gearshift lever.

In order to make it possible to engage a gear only when the clutch 2 is disengaged, a locking device 10 is provided, which prevents the gearshift lever 5 reaching and end position that defined by the end of the respective slot 9a or 9c activates the appropriate contact 7, when the clutch is not disengaged completely. In the example of the operation, this locking device consists of plate 11, which is movably arranged below the gear shifting gate 9 and which has slots 12 for forward gears and slot 12a for reverse, similar to those of the gear shifting gate 9. As can be seen from FIG. 2, these slots 12 and 12a are interconnected by a longitudinal slot 12b having a width wider than the width of longitudinal slot 9b and gear shifting gate 9. Therefore, the slots 12 and 12a are somewhat shorter than the corresponding slots 9a and 9c in the gear shifting gate 9, so that in the position of plate 11 shown in FIG. 2 the gearshift lever 5 can admittedly be introduced into the appropriate gear shifting lane, but cannot be guided to its end position, in which its activates the appropriate contact 7. Only when plate 11 was displaced so far to the left in FIG. 2 against the action of a spring 13 that the slots 12 coincide with the slots 9a in the gear shifting gate 9, can gearshift lever 5 be brought into its end position for enaging one of the gears. This displacement of plate 11 is accomplished with the help of an electromagnet 14 having two coils 14a and 14b, which is activated by an electric control device 15. The control device 15 is connected to a sensor 16, which gives a signal when the clutch is fully disengaged and induces the control device 15 to energize the electromagnet 14a, so that the latter displaces plate 11 and sets free the path for the gearshift lever 5 by aligning slots 12 with slots 9a and 9c and slot 12a with slot 9c so that any of years I, II, III, IV and R can be shifted. A further sensor 17 detects the direction of rotation of the driveshaft 4 and supplies an appropriate signal to the control device 15, so that engaging the reverse gear is prevented as long as the driveshaft is turning in the forward driving direction. Thus, according to the embodiment shown, when sensor 17 detects that the drive shaft turns in the forward direction coil 14b is energized so that plate 11 is shifted to the left for an additional amount into a position in which the slots 9c and 12a do not coincide so that the reverse gear can not be shifted. With plate 11 in this position it is possible to shift into a forward gear only.

FIGS. 3 and 4 show a complete 4-speed gearbox with a reverse gear of conventional design. The input shaft 20 of gearbox 3 is connected through disengageable clutch 2 with the output shaft 21 of engine 1. A gear 22 on input shaft 20 is in mesh with a gear 23 fast on an intermediate shaft 24. Fast on intermediate shaft 24 are the gears 25, 26, 27 and 28 for the 1st, 2nd, 3rd and 4th forward gear step and the gear 29 for the reverse gear. Gears 25, 26, 27 and 28 are in mesh with gears 30, 31, 32 and 33, respectively, which are loose on the output shaft 34 of gearbox 3. A reverse gearshift 35 carries a gear 36 which is in mesh with a gear 38 fast on the output shaft 34. A further gear 38 is non-rotatably but shiftably arranged on reverse gearshift 35 and can be brought into and out of engagement with gear 29 on the intermediate shaft 24. The output shaft 34 carries gearshift collars 39 and 40 which are non-rotatably arranged on output shaft 34 but can be shifted from the neutral position shown in either direction to couple one or the other of the adjacent gears 30, 31 or 32, 33 with the output shaft 34. Collary 39 is connected through a gearshift rod 39a with a gearshift actuator 39b, and collar 40 is connected through a gearshift rod 40a to a gearshift actuator 40b. Furthermore the reverse shift gear 38 is connected through a gearshift rod 39a to a further gearshift actuator 38b. The output shaft 34 is connected to a differential gear 40 to drive wheels 41.

A gearshift lever 5' is arranged for shifting in a gate 9' which has the usual lanes or slots for the individual gears, namely forward gears I, II, III, IV and the reverse gear R. At the end of each slot there is a contact 7 which is engaged by the gearshift lever 5' when it is moved in the corresponding slot. The signal for the gear step to be engaged is fed to an electrical control unit 15' ("ECU 15'"). In addition, the control unit 15' receives signals from sensors 42, 43, 44 and 45 which sense the speed of the gears 30, 31, 32 and 33, respectively; a signal from sensor 46 which senses the speed of the output shaft 34; a signal from sensor 47 which gives a signal whe the clutch is disengaged; and a signal from sensor 48 when the output shaft 34 is not rotating in forward direction. Sensors 46 and 48 could be combined.

The operation is as follows:

When the driver wishes to change gears he actuates the clutch actuating mechanism 2a in FIG. 1 whereby the clutch 2' is disengaged, and sensor 47 gives a corresponding signal to ECU 15' that clutch 2' is disengaged. When the driver shifts the gearshift lever 5' into the appropriate lane, the contact 7 of the intended gear step is activated and a corresponding signal is fed to ECU 15'. ECU 15' compares the speed of the gear of the selected gear step; i.e., the speed of one of the gears 30, 31, 32 or 33 detected by the associated sensor 42, 43, 44 or 45 with the speed of the output shaft 34, and if there is synchronization, an appropriate output signal is fed from ECU 15' to the respective gearshift actuator 39b or 40b to shift gearshift rod 39a or 40a and therewith gearshift collar 39 or 40 to couple the selected gear 30, 31, 32 or 33 with the output shaft 34. If, for instance, the 2nd gear is selected, the collar 31 is shifted to the right so that gear 31 is coupled with output shaft 34.

If the driver selects reverse gear, he shifts gearshift lever 5' into the R-slot of gate 9' closing the respective contact 7 whereby a signal is fed to ECU 15'. If ECU 15' has received signals from sensors 47 and 48 showing that clutch 2' is disengaged and output shaft 34 is not turning in forward direction, an output signal is fed from ECU 15' to gearshift actuator 38b to shift gearshift rod 38a to the left and bringing gear 38 in mesh with gear 29.

The gearshift actuators are preferably hydraulically operated double-acting pistons, the flow of fluid to either side thereof being controlled by electric valves actuated by the signals of ECU 15'. If gearshift lever 5' is returned to its neutral position there is no signal from any of the contacts 7 to ECU 15' and therefore the output signal from ECU 15' ceases and the respective piston returns to its neutral (intermediate) position, and the connection between the respective gear 30, 31, 32 or 33 and output shaft 34 is interrupted.

The invention is not limited to the example of the operation shown. The forces and paths of the switching device 6 can also be generated over hydomechanical or pneumatic structural elements, which are acted upon by existing hydraulic or air pumps. Instead of a gearshift rod for engaging individual gears, electric, pneumatic or hydraulic devices can be assigned to each gear step. These devices are activated by the gearshift lever 5 basically in the same manner described above in connection with the activations of a gearshift rod. Additional sensors may also be provided with determine, for example, the synchronization of the wheels of the gear to be engaged, and give appropriate signals to the control device.

What is claimed is:

1. A gear shifting device for a manually operated transmission for a motor vehicle having wheels driven through said transmission, said transmission having an input shaft connected through a disengageable clutch with a vehicle engine, an output shaft connected to the driven wheels and several gear steps between said input and output shafts; each gear step comprising two intermeshing gears, one of them being fast on an intermediate shaft driven by said input shaft and the other being loosely mounted on said output shaft, and means for engaging and disengaging said gear steps in communication with a gearshift lever which can be moved form a neutral position into a gear shifting position, the movement taking place in two steps—the first step being a preselection step for selecting a gear step and the second step acting to engage the selected gear step; a number of contacts, one for each gear step, to be engaged by the gearshift lever at the end of the second step according to the selected gear step; a locking device which permits movement of the gearshift lever from the first into the second step only when the clutch is disengaged; first sensing means for sensing the speed of each gear on the output shaft and second sensing means for sensing the speed of the output shaft; means for comparing the speeds of the gear selected and the output shaft; means for generating a first output signal if the speeds sensed are synchronized; a third sensing means generating a second output signal when the clutch is disengaged; and means for releasing said locking device upon receipt of said second output signal so that the gearshift lever can be moved from the first into the second step to activate the means for engaging and disengaging gear steps for the selected gear step upon generation of said first output signals.

2. A gear shifting device according to claim 1 for transmission with a reverse gear, and further comprising a sensor which detects the direction of rotation of the output shaft and actuates the means for releasing the locking device to permit the gearshift lever to engage the reverse gear only if the output shaft is not turning in a direction to drive the motor vehicle forwardly.

3. A gear shifting device for a manually operated transmission for a motor vehicle having wheels driven through said transmission, said transmission having an input shaft connected through a disengageable clutch with a vehicle engine, an output shaft connected to the driven wheels and several gear steps between said input and output shafts; each gear step comprising two intermeshing gears, one of them being fast on an intermediate shaft driven by said input shaft and the other being loose on said output shaft, and a gearshift collar associated with the other of said gears and non-rotatably but shiftably arranged on the output shaft; means for shifting said collar into and out of engagement with said other gear; a gearshift lever which can be moved from a neutral position into a gear shifting position, the movement taking place in two steps, the first step being a preselection step for selecting a gear step and the second step acting to engage the selected gear step; a number of contacts, one for each geat step, to be engaged by the gearshift lever at the end of the second step according to the selected gear step; a locking device which permits movement of the gearshift lever from the first into the second step only when the clutch is disengaged; first sensors, one for each other gear of each gear step for sensing the speed thereof; a second sensor for sensing the speed of the output shaft; means for comparing the speed of the gear selected and sensed by the appropriate said first sensor with the speed sensed by said second sensor; means for generating a first output signal if the speed sensed by that first sensor associated with the other gear of the selected gear step equals the speed sensed by the second sensor; a third sensor generating a second output signal when the clutch is disengaged; and means for releasing said locking device upon receipt of said second output signal when the clutch is disengaged; and means for releasing said locking device upon receipt of said second output signal so that the gearshift lever can be moved from the first into the second step to activate shift actuator means for the selected gear step, said shift actuator means shifting said collar into engagement with the other gear of the selected gear step upon generation of said first output signal.

4. A gear shifting device according to claim 3, wherein said transmission comprises a reverse gear and means for bringing the reverse gear in engagement with a gear which is in positive driving connection with the input shaft, and further comprising a fourth sensor for detecting the direction of rotation of said output shaft and generating a signal when said output shaft is not turning in a forward direction, said signal being fed to an electrical control unit to activate the means for shifting the reverse gear only upon receipt of said signal, of a signal from the gear selector means after selection of the reverse gear and of a signal from the third sensor indicating disengagement of said clutch.

5. A gear shifting device according to claim 4, wherein the means for shifting each collar and the reverse gear comprise a gearshift rod and an actuator for shifting said rods in accordance with the output signals from said electrical control unit.

* * * * *